United States Patent
Bhagwan et al.

(10) Patent No.: US 10,114,808 B2
(45) Date of Patent: Oct. 30, 2018

(54) CONFLICT RESOLUTION OF ORIGINALLY PAPER BASED DATA ENTRY

(71) Applicant: International Business Machines Corporation, Armonk, NY (US)

(72) Inventors: Varun Bhagwan, San Jose, CA (US); Daniel F. Gruhl, San Jose, CA (US); Neal R. Lewis, San Jose, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 14/271,478

(22) Filed: May 7, 2014

(65) Prior Publication Data

US 2015/0324341 A1 Nov. 12, 2015

(51) Int. Cl.
| | |
|---|---|
| G06F 17/27 | (2006.01) |
| G06F 17/24 | (2006.01) |
| G06F 17/21 | (2006.01) |
| G06F 13/00 | (2006.01) |

(52) U.S. Cl.
CPC .......... *G06F 17/241* (2013.01); *G06F 17/212* (2013.01)

(58) Field of Classification Search
CPC ...... C06F 17/00; G06F 17/241; G06F 17/212; G06F 17/27; G06F 13/00; G06K 9/00; G06K 7/10
USPC ........................... 715/230; 382/321; 600/407
See application file for complete search history.

(56) References Cited

U.S. PATENT DOCUMENTS

| | | | | |
|---|---|---|---|---|
| 5,048,109 A | * | 9/1991 | Bloomberg | G06K 9/20 382/164 |
| 5,724,985 A | * | 3/1998 | Snell | A61N 1/08 600/510 |
| 5,832,100 A | | 11/1998 | Lawton et al. | |
| 7,421,647 B2 | * | 9/2008 | Reiner | G06F 3/04883 600/407 |
| 7,574,048 B2 | * | 8/2009 | Shilman | G06F 3/04883 345/156 |
| 7,610,192 B1 | * | 10/2009 | Jamieson | G06Q 50/22 704/1 |
| 9,600,882 B2 | * | 3/2017 | Mankovich | G06T 19/00 |

(Continued)

FOREIGN PATENT DOCUMENTS

WO   03065246 A1   8/2003

OTHER PUBLICATIONS

Anderson, "Business automation", Information Management & Technology, The Journal of Cimtech, vol. 39, No. 4, pp. 187-188, Oct.-Dec. 2006.

(Continued)

*Primary Examiner* — Cesar B Paula
*Assistant Examiner* — Jian Huang
(74) *Attorney, Agent, or Firm* — Christopher M. Coy

(57) ABSTRACT

A method for updating automated annotations for a paper-based document is provided. The method may include receiving an image of the paper-based document, the image of the paper-based document including a plurality of highlighted annotations having at least one edited annotation. The method may also include extracting the at least one edited annotation from the received image of the paper-based document. The method may further include adding the extracted at least one edited annotation of the paper-based document to a data retention system.

15 Claims, 3 Drawing Sheets

(56) References Cited

U.S. PATENT DOCUMENTS

| | | | | |
|---|---|---|---|---|
| 2004/0093331 | A1* | 5/2004 | Garner | G06F 19/28 |
| 2006/0136259 | A1* | 6/2006 | Weiner | G06F 19/322 |
| | | | | 705/2 |
| 2009/0138284 | A1* | 5/2009 | Guadagna | G06F 19/322 |
| | | | | 705/3 |
| 2010/0198608 | A1* | 8/2010 | Kaboff | G06Q 10/00 |
| | | | | 705/2 |
| 2010/0214609 | A1 | 8/2010 | Ratnam et al. | |
| 2010/0278453 | A1* | 11/2010 | King | G06Q 10/10 |
| | | | | 382/321 |
| 2011/0010087 | A1* | 1/2011 | Wons | G06F 19/327 |
| | | | | 701/533 |
| 2012/0072204 | A1* | 3/2012 | Nasri | G06F 17/2229 |
| | | | | 704/9 |
| 2012/0301864 | A1* | 11/2012 | Bagchi | G09B 7/02 |
| | | | | 434/362 |
| 2012/0303371 | A1* | 11/2012 | Labsky | G10L 13/08 |
| | | | | 704/260 |
| 2014/0101527 | A1* | 4/2014 | Suciu | G06F 17/241 |
| | | | | 715/230 |

OTHER PUBLICATIONS

Anonymous, "Method and System for Automatic Real Time Information Verification and Immediate Feedback"; An IP.com Prior Art Database Technical Disclosure; IP.com No. IPCOM000217306D, May 7, 2012.

IBM, "Adaptive Sampling Technique for High Volume Complex Data"; An IP.com Prior Art Database Technical Disclosure; IP.com No. IPCOM000010944D, Feb. 3, 2003.

* cited by examiner

US 10,114,808 B2

CONFLICT RESOLUTION OF ORIGINALLY PAPER BASED DATA ENTRY

BACKGROUND

The present invention relates generally to the field of data entry, and more particularly to annotations for paper based data entry.

The process of human subject matter review is often difficult in terms of automated annotation. Subject matter experts (SMEs) may be more familiar with using pen and paper as the markup medium for their edits and may not be familiar or comfortable with using a computer. Currently, annotations may be added to documents to allow for a rapid visual scan of highlighted content or for sensitive data to hide or obfuscate the content. The annotations are typically performed by means of automated analytics via a computer. However, the automated analytics often require corrections.

SUMMARY

An embodiment of the invention includes, a method for updating automated annotations for a paper-based document is provided. The method may include receiving an image of the paper-based document, the image of the paper-based document including a plurality of highlighted annotations having at least one edited annotation. The method may also include extracting the at least one edited annotation from the received image of the paper-based document. The method may further include adding the extracted at least one edited annotation of the paper-based document to a data retention system.

Another aspect of the invention includes, a system for updating automated annotations for a paper-based document is provided. The system may include a memory having computer readable computer instructions; and a processor for executing the computer readable instructions. The instructions may include receive an image of the paper-based document, the image of the paper-based document including a plurality of highlighted annotations having at least one edited annotation. The instructions may also include extract the at least one edited annotation from the received image of the paper-based document. The instructions may further include add the extracted at least one edited annotation of the paper-based document to a data retention system.

Another aspect of the invention includes, a computer program product for updating automated annotations for a paper-based document is provided. The computer program product includes a computer readable storage medium having program code embodied therewith. The program code may be executable by a processor to receive an image of the paper-based document, the image of the paper-based document including a plurality of highlighted annotations having at least one edited annotation. The program code may also be executable by a processor to extract the at least one edited annotation from the received image of the paper-based document. The program code may also be executable by a processor to add the extracted at least one edited annotation of the paper-based document to a data retention system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
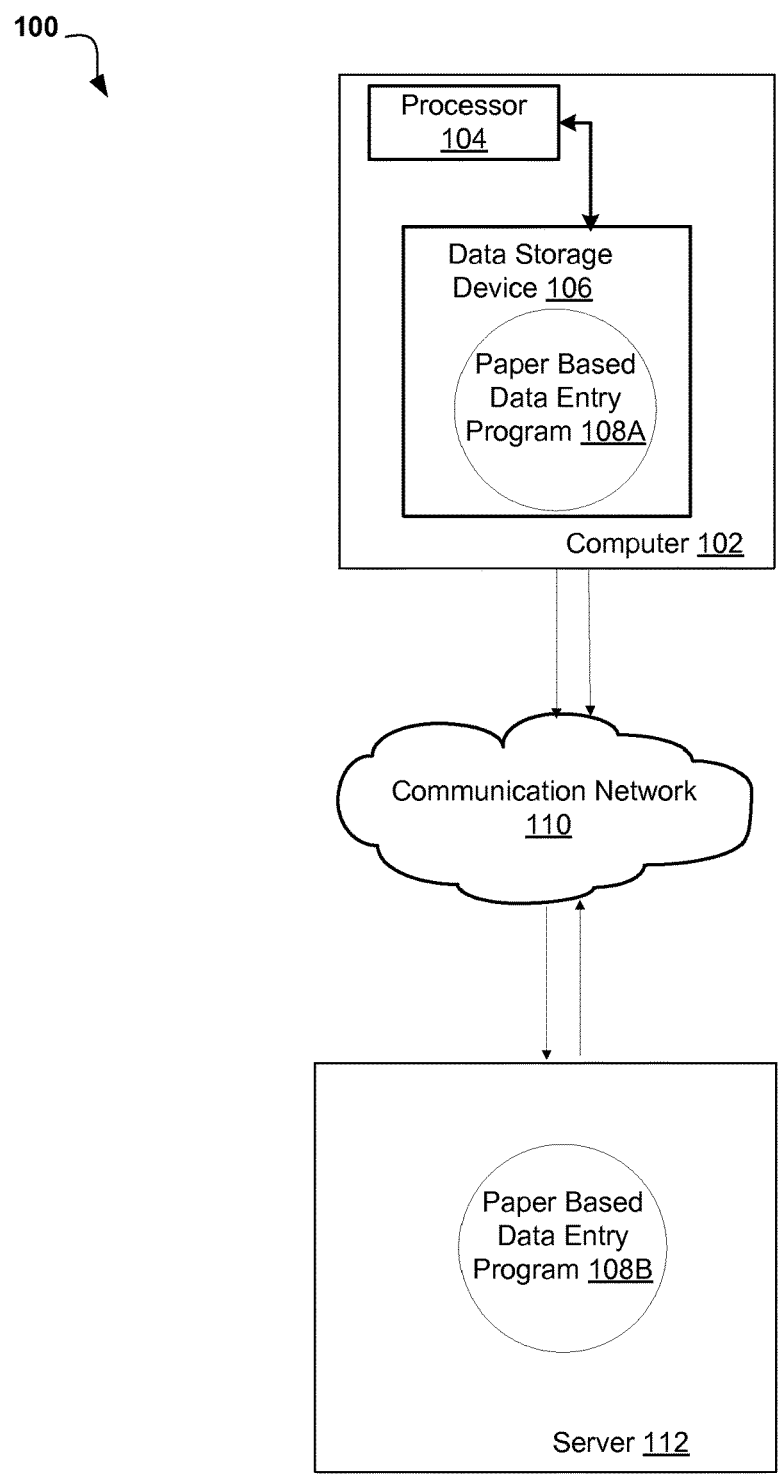
FIG. 1 is a block diagram which illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate field of data entry and more particularly to annotations for paper based data entry. The following described exemplary embodiments provide a system, method and program product to correct or confirm (i.e., update) automated annotations for paper-based documents.

As previously described, the process of human subject matter review is often difficult in terms of automated annotation. Subject matter experts (SMEs) may be more familiar with using pen and paper as the markup medium for their edits and may not be familiar or comfortable with using a computer. Currently, annotations may be added to documents to allow for a rapid visual scan of highlighted content or for relevant data to hide or obfuscate the content. The annotations are typically performed by means of automated analytics via a computer. However, the automated analytics often require corrections. In paper-based documents that contain annotations identifying relative information, such as identifying credit-card and account numbers in a transactional record, there may be a need to correct or confirm (i.e., update) the annotations pertaining to such relevant information. Therefore, there may be need to either correct or confirm the automated annotations for paper-based documents. As such, it may be advantageous, among other things, to provide a methodology where an SME (i.e., a user), who may be more comfortable with the use of a pen or paper rather than a computer, to have the ability to either correct or confirm the automated annotations (i.e., automated entity extraction) for paper-based documents.

According to at least one embodiment of the present invention, once relevant information is identified in a paper based document, such as a fax type document or form, the relevant information may be reprinted and an SME (i.e., a user) may use a pen to edit the automated annotations. Then an image of the paper-based document with edited annotations may be re-scanned (or a similar image providing technology may be used) back into the system and the annotations may be added to a structured data system. For example, in one implementation, a document or form, such as an optical character recognition (OCR) or text analytics of a fax may enter a system. The computer may identify annotations, such as highlighting of a family history or a credit card number. The highlighted document or form may then be printed out and handed to an SME. The SME may use a pen to annotate the highlighted regions on the highlighted document or form. In one implementation, for example, an SME may circle information that should have been highlighted or put an "X" through incorrect annotations. Additionally, a "checkmark" may be placed through correct annotations on the document or form. Furthermore, according to at least one embodiment, the system may place a series of "check boxes" in the margin of the document or form with a line corresponding to an ambiguous reference, requesting the SME to check the correct box. For example, the acronym "CHF" may imply "circular hip fracture" or "congestive heart failure". Therefore, according to one implementation, the system may place two "check boxes" in the margin of the document or form with a line corresponding to the ambiguous reference of "CHF". One "check box" may be next to the interpretation "circular hip fracture" and the other "check box" may be next to the interpretation "congestive heart failure". The SME may then place a check in the "check box" next to the correct interpretation. Once the document or form is approved with the correct annotations, the SME may sign the updated document or form in the provided area.

Then an image of the document or form may be scanned back into the system. According to one implementation, only the edit marks may be interpreted while the remainder of the document or form may not be interpreted. For example, the system may subtract away the original image of the document or form and identify only where all the paper-based mark-ups by the SME were made. As such, the "approved" annotations may be carried forward, updated in the appropriate data retention system (e.g., a database), and used in future documents or forms, such as electronic medical records (EMR). The "approved" annotations have provenance from the signed document or form previously submitted from the SME.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product to correct or confirm (i.e., update) automated annotations for paper-based documents.

According to at least one embodiment of the present invention, documents or forms with highlighted content may be printed and a pen may be used by an SME (i.e., a user) to place a "check mark" over the annotation indicating the annotation is correct and has been approved. Similarly, an annotation may have an "X" through it indicating that the annotation is incorrect and has not been approved (i.e., disapproval). According to at least one implementation, a non-annotated area of the document or form may be "circled" or "underlined", indicating the text should be annotated. Furthermore, according to at least one implementation of the present embodiment, an area of text may link out to a choice box in the margin of the document or form for checking of a correct interpretation where the text may be ambiguous and clarification may be needed. Then the document or from may be signed by the SME. Additionally, when an image of the document or form is scanned back into the system, the "original" text maybe removed and only the token boundaries (i.e., approved annotations, edited marks and text) may be used to identify the tokens that need to be updated for future use in documents and forms, such as an electronic medical record (EMR).

Referring now to FIG. 1, an exemplary networked computer environment 100 in accordance with one embodiment is depicted. The networked computer environment 100 may include a computer 102 with a processor 104 and a data storage device 106 that is enabled to run a paper based data entry program 108A. The networked computer environment 100 may also include a server 112 that is enabled to run a paper based data entry program 108B and a communication network 110. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a paper based data entry program 108A and 108B may run on the client computer 102 or on the server computer 112. The paper based data entry program 108A, 108B may be executed to update annotations based on scanned, hard copy input approved by an SME. For example, a user (i.e., SME) using a paper based data entry program 108A, running on a client computer 102 may connect via a communication network 110 to server computer 112 which may also be running a paper based data entry program 108B. Furthermore, the user (i.e., SME) using client computer 102 or server 112 may print a highlighted document or form requiring clarification of annotations (i.e., relevant information). The SME may use a pen to edit the annotations and then the SME may scan an image of the updated document or form indicating the necessary corrections and/or confirmations pertaining to the annotations into the system. Then, the paper based data entry program 108A, 108B may remove the original text and update the edits pertaining to the annotations into the system for future use in electronic documents or forms. The paper based data entry method is explained in further detail below with respect to FIG. 2.

Figure 2:
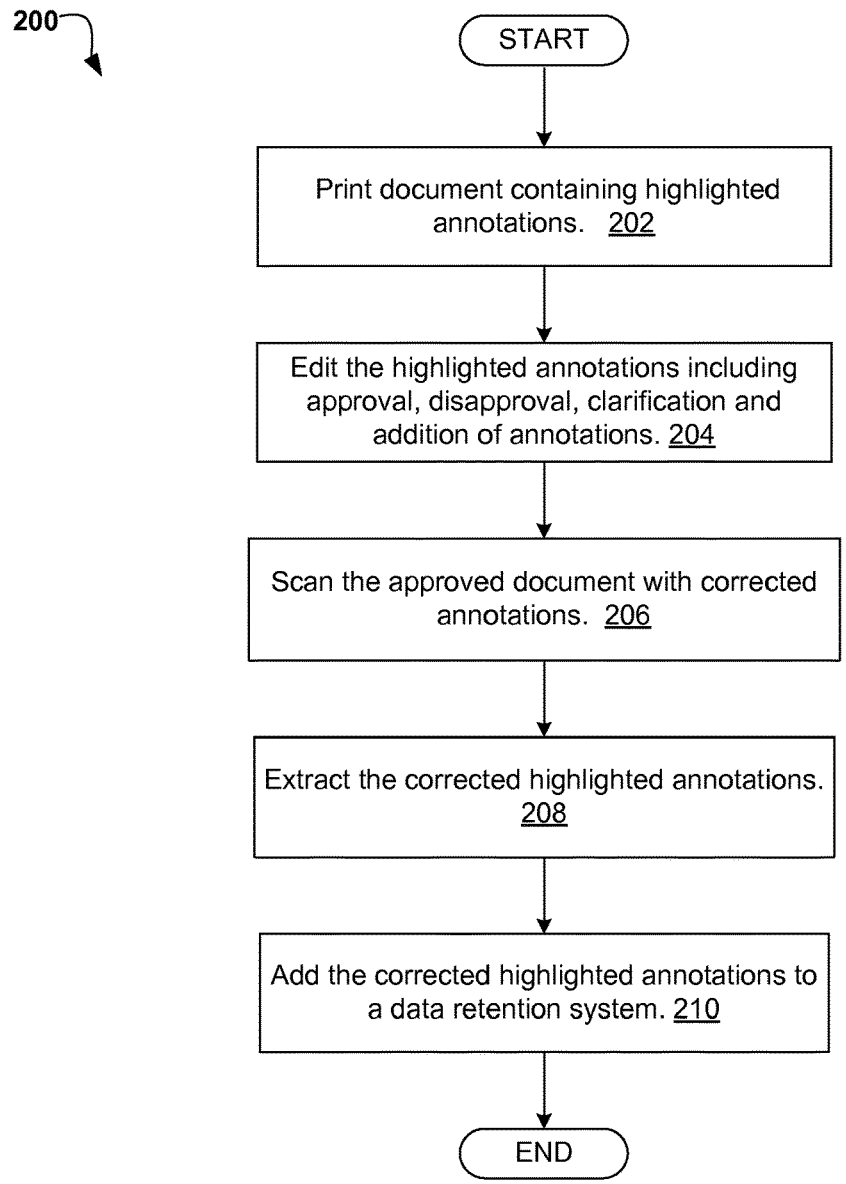
FIG. 2 is an operational flowchart illustrating the steps carried out by a paper based data entry program according to at least one embodiment.

Referring now to FIG. 2 is an operational flowchart 200 illustrating the steps carried out by paper based data entry program 108A and 108B (FIG. 1) in accordance with an embodiment of the present invention is depicted. For example, the embodiment may be implemented as a paper based data entry program 108A, 108B which may be running on client computer 102 (FIG. 1) or server computer 112 (FIG. 1). The paper based data entry program may be executed to update annotations based on scanned, hard copy input approved by an SME.

Referring to FIG. 2 at 202, a document containing highlighted annotations may be printed by a user. For example, a subject matter expert (SME) may print an original fax from an out of area network doctor's office that contains highlighted annotations corresponding to proposed medical information to be entered into an electronic health record (EHR).

Next at 204, the user may edit the highlighted annotations. The editing by the user may include approval, disapproval, clarification and addition of any annotations. With respect to the previous example, the SME may use a pen to annotate the highlighted regions on the highlighted document or form. As such, according to one implementation, the SME may circle information that should have been highlighted (i.e., an addition) or put an "X" through incorrect annotations (i.e., a disapproval). Additionally, the SME may place a "checkmark" through correct annotations (i.e., an approval) on the document or form. Furthermore, according to at least one embodiment, the system may place a series of "check boxes" in the margin of the document or form with a line corresponding to an ambiguous reference, requesting the SME to check the correct box (i.e., a clarification). For example, "CHF" may imply "circular hip fracture" or "congestive heart failure". Therefore, according to one implementation, the system may place two "check boxes" in the margin of the document or form with a line corresponding to the ambiguous reference of "CHF". One "check box" may be next to the interpretation "circular hip fracture" and the other "check box" may be next to the interpretation "congestive heart failure". The SME may then place a check in the "check box" next to the correct interpretation.

Additionally, according to at least one implementation, once the document or form is approved with the correct annotations, the SME may sign (i.e., an overall approval) the edited document or form in a provided area. Then at 206, an image of the approved highlighted document or form with the corrected (i.e., edited) annotations may be scanned (or via another image providing technology) back into the system.

Next at 208, the system may extract the corrected (i.e., edited) annotations. For example, according to one implementation, only the edit marks may be interpreted by the system while the remainder of the document or form may not be interpreted. As such, the system may subtract away the original image of the document or form and identify only where all the paper-based corrections (i.e., edits) by the SME were made.

Then at 210, the corrected highlighted annotations may be added to the appropriate retention system. For example, the "approved" annotations may be carried forward, updated in the appropriate data retention system (e.g., a database), and used in future documents or forms, such as electronic medical records (EMR). As such, the "approved" annotations have provenance from the signed document or form previously submitted from the SME.

Figure 3:
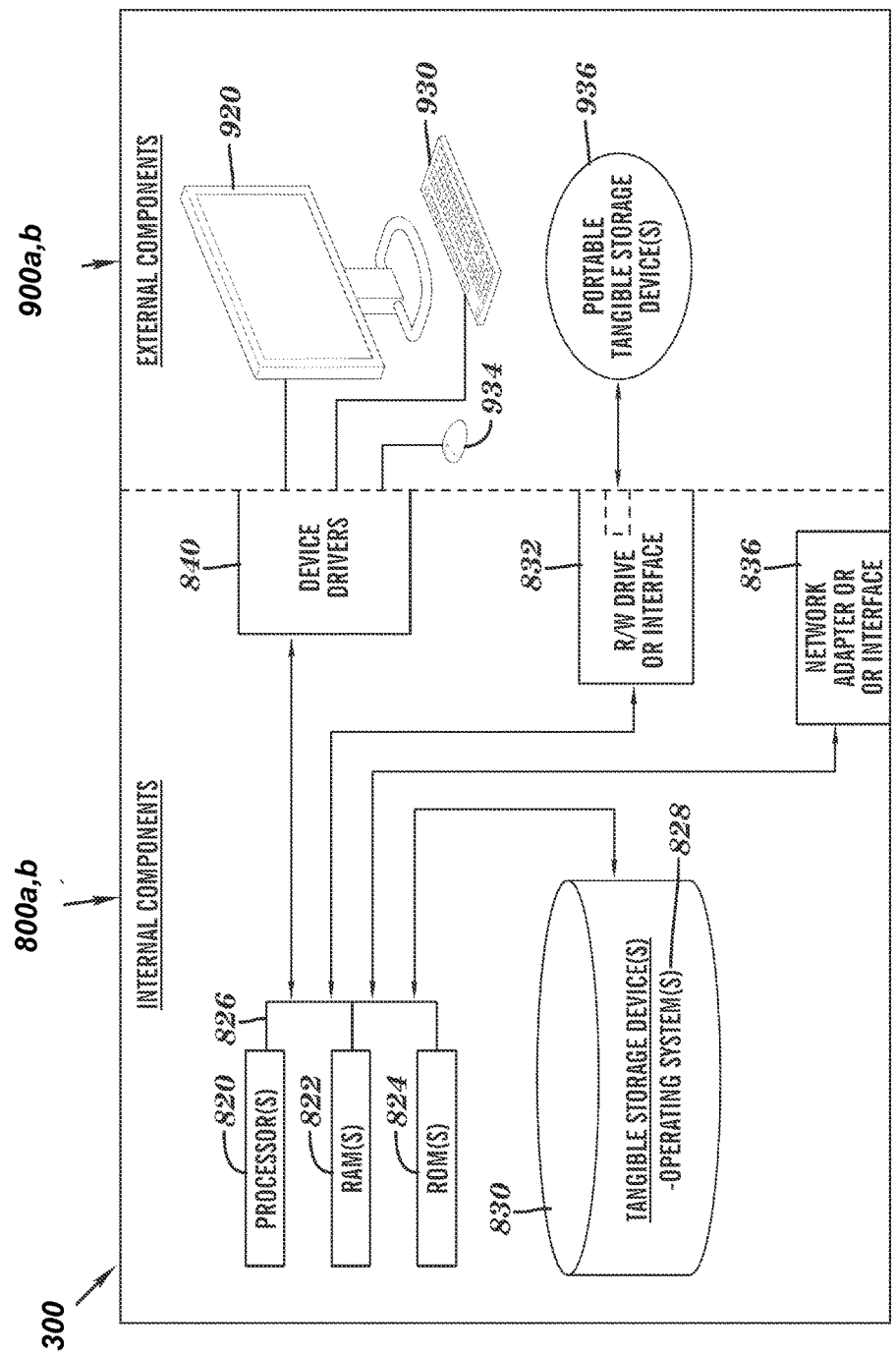
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and paper based data entry program 108A (FIG. 1) in client computer 102 and paper based data entry program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as paper based data entry program 108A and 108B, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. The paper based data entry program 108A in client computer 102 and paper based data entry program 108B in network server 112 can be downloaded to client computer 102 from an external computer via a network (for example, the Internet, a local area network or other, wide area network) and respective network adapters or interfaces 836. From the network adapters or interfaces 836, the paper based data entry program 108A in client computer 102 and the paper based data entry program 108B in network server computer 112 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for updating automated annotations for a paper based document, the method comprising:
   identifying, by an automated system utilizing optical character recognition, ambiguous content within a paper-based medical record, wherein the ambiguous content includes one or more terms that each correspond to a same acronym, wherein the automated system is located on one or more client devices and on a server that is communicatively coupled to the one or more client devices over a communications network;
   highlighting, by the automated system, the ambiguous content, wherein the highlighted ambiguous content within the paper-based document comprises information corresponding to automated entity extraction;
   including, by the automated system, an area of text that links to a choice box within a margin of the paper-based document;
   transmitting, by the automated system and to the SME, an electronically transmitted image of the paper-based document;
   receiving, by the automated system, an edited image of the paper-based document that includes:
      at least one edited annotation made by the SME that clarifies the ambiguous content, wherein the edited at least one annotation comprises a manual edit using a pen on the paper-based document including the plurality of highlighted ambiguous content, wherein the manual edit using the pen comprises at least one of an approval of an annotation, a disapproval of an annotation, a clarification of an annotation, and an addition of an annotation, wherein the disapproval of the annotation comprises placing an "X" through the annotation, and wherein the approval of the annotation comprises placing a "check mark" through the annotation, and wherein the clarification of the annotation comprises placing a "check mark" in an appropriate check box, wherein the addition of the annotation comprises circling or underlining a non-annotated area of the paper-based document; and
      an approval, by the SME filing in the choice box, of the at least one edited annotation;
   extracting the at least one edited annotation from the received image of the paper-based document, wherein only the at least one edited annotation is identified while the remainder of the paper-based document is subtracted;
   in response to determining the extracted at least one edited annotation is approved by the SME, adding the extracted at least one edited annotation of the paper-based document to a data retention system, wherein the data retention system is a structured data system located on the server and includes a plurality of electronic medical records (EMR), wherein the plurality of electronic medical records are an electronic representation of the medical record;
   retrieving the approved added extracted at least one edited annotation to identify and update the plurality of EMR within the data retention system that include the highlighted ambiguous content by replacing the highlighted ambiguous content with the approved at least one edited annotation;
   updating previously stored ambiguous content that was highlighted within the data retention system with the approved at least one edited annotation, and wherein updating the previously stored highlighted ambiguous content within the data retention system includes updating the previously stored highlighted ambiguous content within the one or more client devices; and
   rescanning the paper-based document back into the automated system;
   removing original text from the rescanned paper-based document; and
   utilizing acronym token boundaries to identify any acronym tokens within the paper-based that are needed to be updated for future use in previously saved EMRs.

2. A system for updating automated annotations for a paper based document, the system comprising:
   a memory having computer readable computer instructions; and
   a processor for executing the computer readable instructions, the instructions including:
   identify, by an automated system utilizing optical character recognition, ambiguous content within a paper-based medical record, wherein the ambiguous content includes one or more terms, wherein the automated system is located on one or more client devices and on a server that is communicatively coupled to the one or more client devices over a communications network;
   highlight, by the automated system, the ambiguous content;
   include, by the automated system, an area of text that links to a choice box within a margin of the paper-based document;
   transmit, by the automated system and to the SME an electronically transmitted image of the paper-based document;
   receive, by the automated system, an edited image of the paper-based document that includes:
      at least one edited annotation made by the SME that clarifies the ambiguous content; and
      an approval, by the SME filing in the choice box, of the at least one edited annotation;
   extract the at least one edited annotation from the received image of the paper-based document, wherein only the at least one edited annotation is identified while the remainder of the paper-based document is subtracted;
   in response to determining the extracted at least one edited annotation is approved by the SME, adding the extracted at least one edited annotation of the paper-based document to a data retention system, wherein the data retention system is a structured data system located on the server and includes a plurality of electronic medical records (EMR), wherein the plurality of electronic medical records are an electronic representation of the medical record;
   retrieve the approved added extracted at least one edited annotation to identify and update the plurality of EMR within the data retention system that include the highlighted ambiguous content by replacing the highlighted ambiguous content with the approved at least one edited annotation;
   update previously stored ambiguous content that was highlighted within the data retention system with the approved at least one edited annotation, and wherein updating the previously stored highlighted ambiguous content within the data retention system includes updating the previously stored highlighted ambiguous content within the one or more client devices;
rescan the paper-based document back into the automated system;
remove original text from the rescanned paper-based document; and
utilize acronym token boundaries to identify any acronym tokens within the paper-based that are needed to be updated for future use in previously saved EMRs.

3. The system of claim 2, wherein the plurality of highlighted ambiguous content within the paper-based document comprises information corresponding to automated entity extraction.

4. The system of claim 2, wherein the edited at least one annotation comprises a manual edit using a pen on the paper-based document including the plurality of highlighted ambiguous content.

5. The system of claim 4, wherein the manual edit using a pen comprises at least one of an approval of an annotation, a disapproval of an annotation, a clarification of an annotation, and an addition of an annotation.

6. The system of claim 5, wherein the disapproval of an annotation comprises placing an "X" through the annotation, and wherein the approval of an annotation comprises placing a "check mark" through the annotation, and wherein the clarification of an annotation comprises placing a "check mark" in an appropriate check box.

7. The system of claim 5, wherein the addition of an annotation comprises circling or underlining a non-annotated area of the paper-based document.

8. A computer program product for updating automated annotations for a paper-based document, the computer program product comprising: a non-transitory computer readable storage medium having program code embodied therewith, the program code is executable by a processor to:
identify, by an automated system utilizing optical character recognition, ambiguous content within a paper-based medical record, wherein the ambiguous content includes one or more terms, wherein the automated system is located on one or more client devices and on a server that is communicatively coupled to the one or more client devices over a communications network;
highlight, by the automated system, the ambiguous content;
include, by the automated system, an area of text that links to a choice box within a margin of the paper-based document;
transmit, by the automated system and to a subject matter expert (SME), an electronically transmitted image of the paper-based document;
receive, by the automated system, an edited image of the paper-based document that includes:
at least one edited annotation made by the SME that clarifies the ambiguous content; and
an approval, by the SME filing in the choice box, of the at least one edited annotation;
extract the at least one edited annotation from the received image of the paper-based document, wherein only the at least one edited annotation is identified while the remainder of the paper-based document is subtracted;
in response to determining the extracted at least one edited annotation is approved by the SME, adding the extracted at least one edited annotation of the paper-based document to a data retention system, wherein the data retention system is a structured data system located on the server and includes a plurality of electronic medical records (EMR), wherein the plurality of electronic medical records are an electronic representation of the medical record;
retrieve the approved added extracted at least one edited annotation to identify and update the plurality of EMR within the data retention system that include the highlighted ambiguous content by replacing the highlighted ambiguous content with the approved at least one edited annotation;
update previously stored ambiguous content that was highlighted within the data retention system with the approved at least one edited annotation, and wherein updating the previously stored highlighted ambiguous content within the data retention system includes updating the previously stored highlighted ambiguous content within the one or more client devices;
rescan the paper-based document back into the automated system;
remove original text from the rescanned paper-based document; and
utilize acronym token boundaries to identify any acronym tokens within the paper-based that are needed to be updated for future use in previously saved EMRs.

9. The program product of claim 8, wherein the plurality of highlighted ambiguous content within the paper-based document comprises information corresponding to automated entity extraction.

10. The program product of claim 8, wherein the edited at least one annotation comprises a manual edit using a pen on the paper-based document including the plurality of highlighted ambiguous content.

11. The program product of claim 10, wherein the manual edit using a pen comprises at least one of an approval of an annotation, a disapproval of an annotation, a clarification of an annotation, and an addition of an annotation.

12. The program product of claim 11, wherein the manual edit using a pen comprises an overall approval of the edited at least one annotation.

13. The program product of claim 11, wherein the disapproval of an annotation comprises placing an "X" through the annotation, and wherein the approval of an annotation comprises placing a "check mark" through the annotation, and wherein the clarification of an annotation comprises placing a "check mark" in an appropriate check box, wherein the addition of an annotation comprises circling or underlining a non-annotated area of the paper-based document.

14. The method of claim 1, further comprising:
modifying a template form that is used in the future based on the approved added extracted at least one edited annotation; and
determining which data retention system to add the extracted at least one edited annotation.

15. The method of claim 1, further comprising:
generating, by the automated system, two different interpretations of the ambiguous content;
adding, by the automated system, the two different interpretations to the electronically transmitted image, wherein the two different interpretations each have their own choice box; and
receiving, by the automated system and from the SME, a selection of one of the two different interpretations.

* * * * *